United States Patent
Hung et al.

(10) Patent No.: US 9,741,998 B2
(45) Date of Patent: Aug. 22, 2017

(54) METHOD FOR MANUFACTURING ENERGY-STORAGE COMPOSITE MATERIAL

(71) Applicant: METAL INDUSTRIES RESEARCH & DEVELOPMENT CENTRE, Kaohsiung (TW)

(72) Inventors: Chun-Hung Hung, Kaohsiung (TW); Chi-Hui Chen, Kaohsiung (TW); Ying-Cheng Lu, Kaohsiung (TW); Ho-Chung Fu, Kaohsiung (TW)

(73) Assignee: METAL INDUSTRIES RESEARCH & DEVELOPMENT CENTRE, Kaohsiung (TW)

(*) Notice: Subject to any disclaimer, the term of this patent is extended or adjusted under 35 U.S.C. 154(b) by 0 days.

(21) Appl. No.: 14/983,394

(22) Filed: Dec. 29, 2015

(65) Prior Publication Data

US 2017/0187028 A1 Jun. 29, 2017

(51) Int. Cl.
*H01M 4/04* (2006.01)
*H01M 10/0525* (2010.01)
*H01M 4/133* (2010.01)
*H01M 4/1393* (2010.01)
*H01M 4/36* (2006.01)
(Continued)

(52) U.S. Cl.
CPC ......... *H01M 4/0402* (2013.01); *H01M 4/133* (2013.01); *H01M 4/1393* (2013.01); *H01M 4/366* (2013.01); *H01M 4/48* (2013.01); *H01M 4/583* (2013.01); *H01M 10/0525* (2013.01)

(58) Field of Classification Search
USPC .................................................. 427/113, 115
See application file for complete search history.

(56) References Cited

U.S. PATENT DOCUMENTS 7,105,108 B2 * 9/2006 Kaschak ................ B82Y 30/00
  252/378 R
7,745,047 B2   6/2010 Zhamu et al.
(Continued)

FOREIGN PATENT DOCUMENTS

TW   201518208 A   5/2015

OTHER PUBLICATIONS

English abstract translation of TW201518208A.

*Primary Examiner* — Brian K Talbot
(74) *Attorney, Agent, or Firm* — WPAT, P.C., Intellectual Property Attorneys; Anthony King

(57) ABSTRACT

The present disclosure provides a method for manufacturing an energy-storage composite material. The method includes (a) providing a solution having a carbon substrate, and placing the solution in a pressure container, and a surface of the carbon substrate having an energy-storage active precursor; (b) stirring the solution having the carbon substrate at a first stirring speed, and venting air in the pressure container at a first temperature, such that a pressure in the pressure container reaches a first pressure and is maintained for a first period of time; and (c) introducing a fluid into the pressure container, stirring the solution having the carbon substrate at a second stirring speed, increasing a pressure and a temperature in the pressure container to a second pressure and a second temperature and maintaining for a second period of time, and then reducing the pressure to the atmosphere pressure to obtain an energy-storage composite material.

6 Claims, 3 Drawing Sheets

(51) Int. Cl.
*H01M 4/48* (2010.01)
*H01M 4/583* (2010.01)

(56) References Cited

U.S. PATENT DOCUMENTS

| | | | |
|---|---|---|---|
| 8,551,657 B2 | 10/2013 | Yoshida et al. | |
| 2004/0034151 A1* | 2/2004 | Kaschak | C08K 3/04 524/495 |
| 2005/0014867 A1* | 1/2005 | Gulari | B01J 3/008 523/215 |
| 2010/0044646 A1* | 2/2010 | Zhamu | B82Y 30/00 252/511 |
| 2012/0058397 A1* | 3/2012 | Zhamu | H01M 4/13 429/231.8 |
| 2012/0321953 A1* | 12/2012 | Chen | B82Y 30/00 429/219 |
| 2015/0044556 A1* | 2/2015 | Wang | H01M 4/366 429/221 |
| 2016/0043384 A1* | 2/2016 | Zhamu | H01M 4/133 429/231.4 |
| 2016/0101398 A1* | 4/2016 | Worsley | B01J 13/0091 106/122 |
| 2016/0176714 A1* | 6/2016 | Do | C01B 31/0484 423/448 |

\* cited by examiner

METHOD FOR MANUFACTURING ENERGY-STORAGE COMPOSITE MATERIAL

BACKGROUND OF THE DISCLOSURE

1. Field of the Disclosure

The disclosure relates to a method for manufacturing an energy-storage composite material.

2. Description of the Related Art

Energy storage generally refers to storing electric energy or chemical energy in a specific material or substance in an original or another form, for example, secondary battery energy-storage technology. At present, an anode material of the secondary battery, for example, a lithium-ion battery, majorly is graphite, of which a theoretical capacity has reached a development bottleneck. In addition, the graphite may exfoliate, when an interlayer distance thereof is large enough, to produce graphene. A capacity of a graphene anode material generally is greater than that of the graphite. However, the graphene is easy to restack to form graphite during use, and after repeatedly charging and discharging many times, performance of the graphene is gradually reduced to a level the same as that of the graphite.

SUMMARY OF THE DISCLOSURE

The present disclosure provides a method for manufacturing an energy-storage composite material. In an embodiment, the method includes (a) providing a solution having a carbon substrate, and placing the solution in a pressure container, and a surface of the carbon substrate having an energy-storage active precursor; (b) stirring the solution having the carbon substrate at a first stirring speed, and venting air from the pressure container at a first temperature, such that a pressure in the pressure container reaches a first pressure and is maintained for a first period of time; and (c) introducing a fluid into the pressure container, stirring the solution having the carbon substrate at a second stirring speed, increasing a pressure and a temperature in the pressure container to a second pressure and a second temperature and maintaining for a second period of time, and then reducing the pressure to the atmosphere pressure to obtain an energy-storage composite material.

By using the method for manufacturing the energy-storage composite material according to the present disclosure, a manufacturing time can be shortened, and the process is simple and easy, and is suitable for massive production. Moreover, by using the method for manufacturing the energy-storage composite material according to the present disclosure, dimensions of energy-storage active compounds in the energy-storage composite material can be reduced, energy-storage efficiency can be improved and a high charge/discharge rate capability can be increased. In addition, by using the method for manufacturing the energy-storage composite material according to the present disclosure, addition of a solvent or surfactant can be reduced.

DETAILED DESCRIPTION OF THE DISCLOSURE

Figure 1:
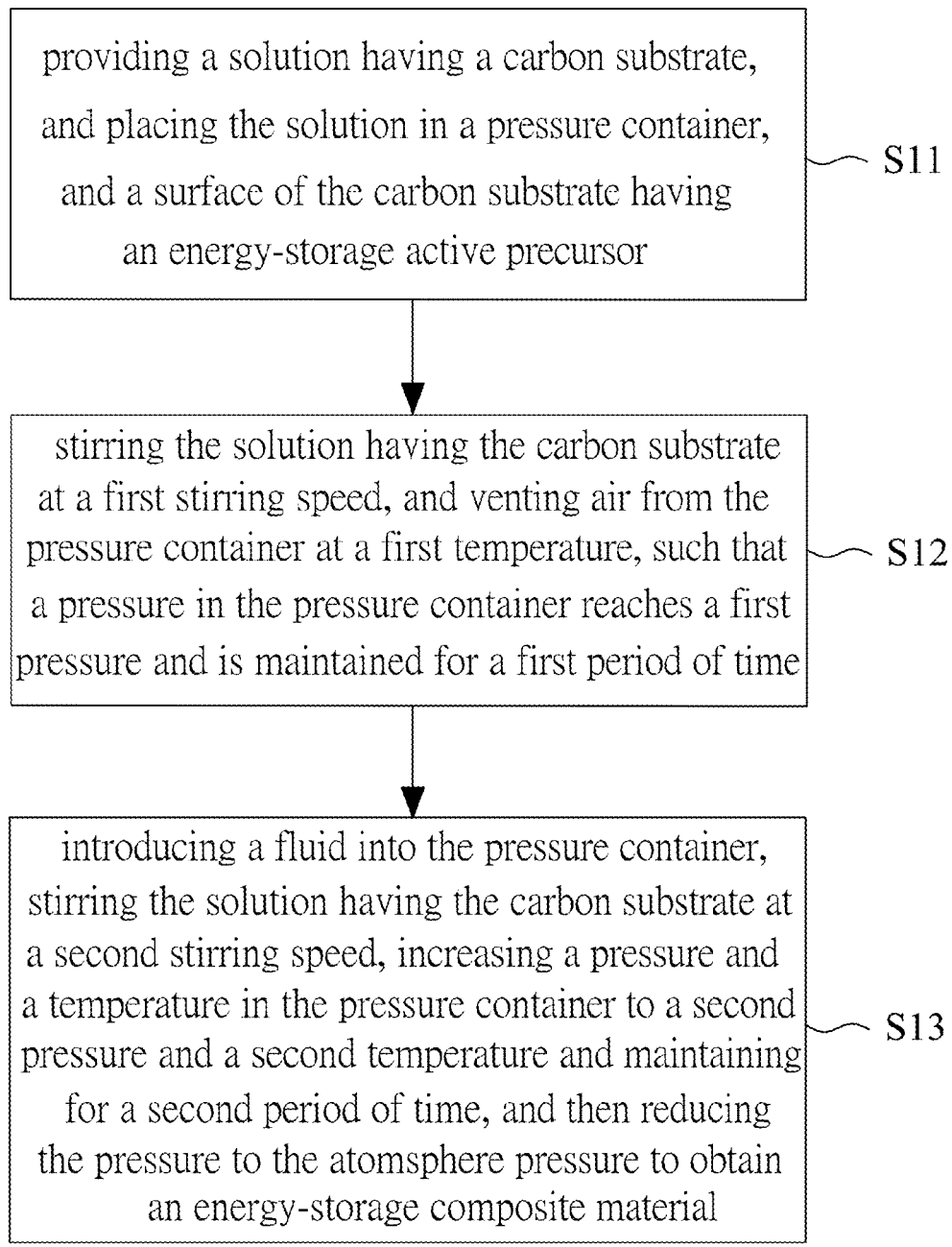
FIG. 1 is a schematic flowchart of a method for manufacturing an energy-storage composite material according to the present disclosure.

FIG. 1 is a schematic flowchart of a method for manufacturing an energy-storage composite material according to the present disclosure. Referring to step S11, a solution having a carbon substrate is provided, and the solution is placed in a pressure container, and a surface of the carbon substrate has an energy-storage active precursor. In an embodiment, the carbon substrate is at least one from a group having graphene. The solution having the carbon substrate includes graphene sheets, metal compounds and alcohols solution. The alcohol may be a short-chain alcohol with a number of carbon atoms being one to three, for example, ethyl alcohol. The metal compound may be a compound of group IV elements or a transition metal compound, or may be a tin-containing compound, for example, stannous chloride. Subsequently, a suitable amount of sodium hydroxide is further added into the foregoing solution having the carbon substrate. Therefore, the surface of the carbon substrate has an energy-storage active precursor, and the energy-storage active precursor may be at least one from a group having compounds of group IV elements or transition metal compounds. In an embodiment, the energy-storage active precursor is at least one from a group having tin based compounds. In an embodiment, the solution having the carbon substrate is stirred at the atmosphere pressure for 30 minutes to 4 hours, such that the surface of the carbon substrate has the energy-storage active precursor.

Referring to step S12, the solution having the carbon substrate is stirred at a first stirring speed and air in the pressure container is vented at a first temperature, such that a pressure in the pressure container reaches a first pressure and is maintained for a first period of time. In an embodiment, the first stirring speed is between 10 rpm and 2000 rpm. The first pressure is larger than a saturated vapor pressure of the solution having the carbon substrate, so as to prevent the solution from being extracted. As stated in the above embodiment, if the solution having the carbon substrate includes graphene sheets, stannous chloride, ethyl alcohol solution, and a suitable amount of sodium hydroxide, the first pressure is between 0.008 MPa and 0.1 MPa.

The first temperature is less than a boiling point of the solution having the carbon substrate, so as to prevent the solution from volatilizing. The first temperature is between the room temperature and 80° C. The first period of time is between 1 second and 30 minutes.

Referring to step S13, a fluid is introduced into the pressure container, the solution having the carbon substrate is stirred at a second stirring speed, the pressure and the temperature in the pressure container are increased to a second pressure and a second temperature and are maintained for a second period of time, and then the pressure is reduced to the atmosphere pressure to obtain an energy-storage composite material. In an embodiment, the fluid is carbon dioxide, which may be compressed carbon dioxide or liquid carbon dioxide. The second stirring speed is between 20 rpm and 2000 rpm. The second pressure is between 7 MPa and 30 MPa, that is, the pressure container is enabled to have a supercritical carbon dioxide, and in the supercritical carbon dioxide environment, such that energy-storage active compounds can be evenly filled in the carbon substrate due to excellent penetration ability of supercritical carbon dioxide. The second temperature is between 40° C. and 200° C. The second period of time is between 30 minutes and 4 hours.

By using the method for manufacturing the energy-storage composite material according to the present disclosure, a manufacturing time can be shortened, and the process is simple and easy, and is suitable for massive production. Moreover, by using the method for manufacturing the energy-storage composite material according to the present disclosure, dimensions of energy-storage active compounds in the energy-storage composite material can be reduced, energy-storage efficiency can be improved and a high charge/discharge rate capability can be increased. In addition, by using the method for manufacturing the energy-storage composite material according to the present disclosure, addition of a solvent or surfactant can be reduced.

The present disclosure is described below in detail with the following examples, but it does not mean that the present disclosure is merely limited to the disclosure of these examples.

Comparison Example 1

Figure 2:
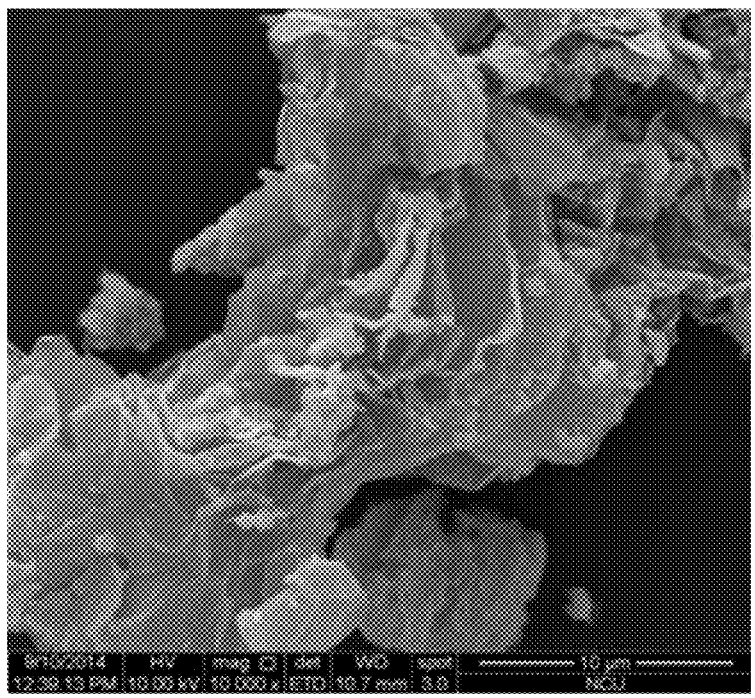
FIG. 2 is an electron microscope picture of an energy-storage composite material of Comparison Example 1.

A solution having the carbon substrate is prepared. The solution having the carbon substrate includes graphene sheets, stannous chloride, sodium hydroxide, and a suitable amount of ethyl alcohol solution. The solution is stirred at the atmosphere pressure for 2 hours. The solution having the carbon substrate is stirred at the atmosphere pressure and 55° C. for 2 hours to obtain an energy-storage composite material of nano tin dioxide and graphene. In Comparison Example 1, neither air is vented from an environment of the solution having the carbon substrate, nor a supercritical fluid is introduced therein. In Comparison Example 1, the manufactured energy-storage composite material has a lithium storage specific capacity of approximately 505 mAh/g at a charge/discharge rate of 0.2 A/g. Referring to FIG. 2, it shows that tin dioxide particles of the energy-storage composite material are unevenly attached to graphene sheets.

Comparison Example 2

Figure 3:
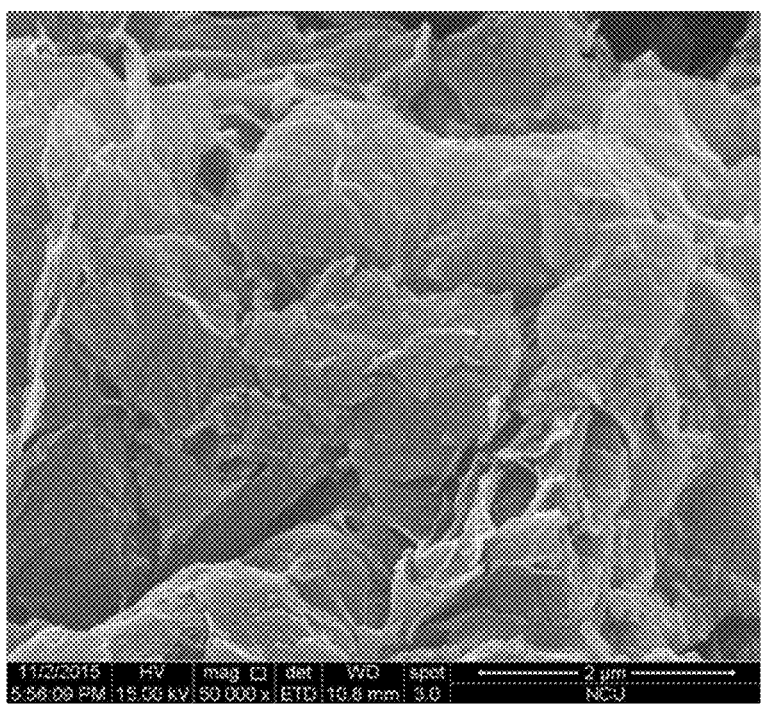
FIG. 3 is an electron microscope picture of an energy-storage composite material of Comparison Example 2.

A solution having the carbon substrate is prepared. The solution having the carbon substrate includes graphene sheets, stannous chloride, sodium hydroxide, and a suitable amount of ethyl alcohol solution. The solution is stirred at the atmosphere pressure for 2 hours. The solution having the carbon substrate is placed in a pressure container. Subsequently, a compressed carbon dioxide is introduced into the pressure container. The solution having the carbon substrate is stirred at a stirring speed of 450 rpm. A temperature in the pressure container is increased to 55° C., and a pressure in the pressure container is increased to 11.5 MPa, and maintained for 2 hours, and then reduced to the atmosphere pressure to obtain an energy-storage composite material of nano tin dioxide and graphene. In Comparison Example 2, air is not vented from an environment of the solution having the carbon substrate. In Comparison Example 2, the manufactured energy-storage composite material has a lithium storage specific capacity of approximately 664 mAh/g at a charge/discharge rate of 0.2 A/g, and has a lithium storage specific capacity of approximately 203 mAh/g at a charge/discharge rate of 6 A/g. Referring to FIG. 3, it shows that tin dioxide particles of a energy-storage composite material are evenly attached to graphene sheets.

Example 1

Figure 4:
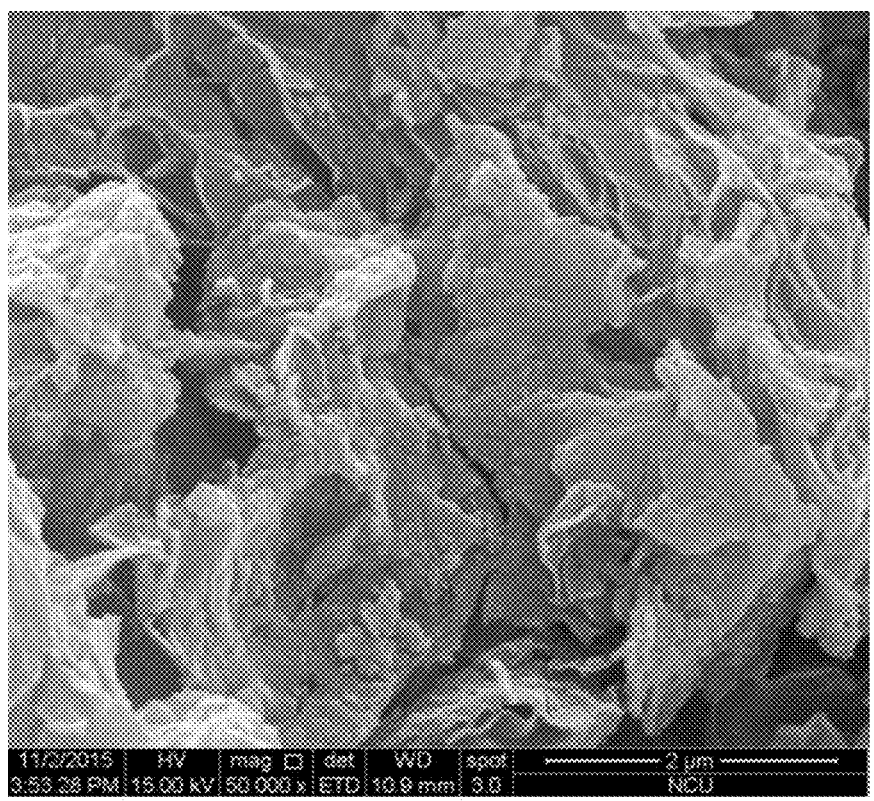
FIG. 4 is an electron microscope picture of an energy-storage composite material of Example 1.

A solution having the carbon substrate is prepared. The solution having the carbon substrate includes graphene sheets, stannous chloride, sodium hydroxide, and a suitable amount of ethyl alcohol solution. The solution is stirred at the atmosphere pressure for 2 hours. The solution having the carbon substrate is placed in a pressure container. The solution having the carbon substrate is stirred at a stirring speed of 450 rpm, and air in the pressure container is vented by using a vacuum pump. The pressure in the pressure container is maintained at 0.06 MPa and at a room temperature for 5 minutes. Subsequently, a compressed carbon dioxide is introduced into the pressure container. The solution having the carbon substrate is stirred at a stirring speed of 450 rpm. A temperature in the pressure container is increased to 55° C., and a pressure in the pressure container is increased to 11.5 MPa, and maintained for 2 hours, and then reduced to the atmosphere pressure to obtain an energy-storage composite material of nano tin dioxide and graphene. In Example 1, the manufactured energy-storage composite material has a lithium storage specific capacity of approximately 736 mAh/g at a charge/discharge rate of 0.2 A/g, and has a lithium storage specific capacity of approximately 483 mAh/g at a charge/discharge rate of 6 A/g, and the two capacities are both greater than the lithium storage specific capacities of Comparison Example 1 and Comparison Example 2. Referring to FIG. 4, as compared with Comparison Example 1 of FIG. 2 and Comparison Example 2 of FIG. 3, it shows that the energy-storage composite material has smaller nano tin dioxide particles that are more evenly attached to the graphene sheets.

Example 2

A solution having the carbon substrate is prepared. The solution having the carbon substrate includes graphene sheets, stannous chloride, sodium hydroxide, and a suitable amount of ethyl alcohol solution. The solution is stirred at the atmosphere pressure for 2 hours. The solution having the carbon substrate is placed in a pressure container. The solution having the carbon substrate is stirred at a stirring speed of 450 rpm, and air in the pressure container is vented by using a vacuum pump. The pressure in the pressure container is maintained at 0.03 MPa and at a room temperature for 5 minutes. Subsequently, a compressed carbon dioxide is introduced into the pressure container. The solution having the carbon substrate is stirred at a stirring speed of 450 rpm. A temperature in the pressure container is increased to 55° C., and a pressure in the pressure container is increased to 11.5 MPa, and maintained for 2 hours, and then reduced to the atmosphere pressure to obtain an energy-storage composite material of nano tin dioxide and graphene. In Example 2, the manufactured energy-storage composite material has a lithium storage specific capacity of approximately 655 mAh/g at a charge/discharge rate of 0.2 A/g, and has a lithium storage specific capacity of approximately 356 mAh/g at a charge/discharge rate of 6 A/g.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:

1. A method for manufacturing an energy-storage composite material comprising:

(a) providing a solution having a carbon substrate, wherein the solution having the carbon substrate comprises graphene sheets, metal compounds, sodium hydroxide and alcohol, and placing the solution in a pressure container, and a surface of the carbon substrate having an energy-storage active precursor;

(b) stirring the solution having the carbon substrate at a first stirring speed between 10 rpm and 2000 rpm, and venting air from the pressure container at a first temperature less than a boiling point of the solution having the carbon substrate, such that a pressure in the pressure container reaches a first pressure larger than a saturated vapor pressure of the solution having the carbon substrate and is maintained for a first period of time between 1 second and 30 minutes; and (c) introducing carbon dioxide into the pressure container, stirring the solution having the carbon substrate at a second stirring speed between 20 rpm and 2000 rpm, increasing a pressure and a temperature in the pressure container to a second pressure between 7 MPa and 30 MPa and a second temperature between 40° C. and 200° C. and maintaining for a second period of time between 30 minutes and 4 hours, and then reducing the pressure to the atmosphere pressure to obtain an energy-storage composite material.

2. The method according to claim 1, wherein the surface of the carbon substrate of the energy-storage composite material has energy-storage active precursor.

3. The method according to claim 1, wherein the metal compound are a compound of group IV elements or a transition metal compound, the alcohol is a short-chain alcohol with a number of carbon atoms being one to three.

4. The method according to claim 1, wherein the solution having the carbon substrate is stirred at the atmosphere pressure for 30 minutes to 4 hours, such that the surface of the carbon substrate has the energy-storage active precursor.

5. The method according to claim 1, wherein in the step (b), the first pressure is between 0.008 MPa and 0.1 MPa.

6. The method according to claim 1, wherein in the step (b), the first temperature is between a room temperature and 80° C.

* * * * *